(12) United States Patent
Zheng et al.

(10) Patent No.: US 6,251,333 B1
(45) Date of Patent: Jun. 26, 2001

(54) METHOD FOR MANUFACTURING A FILM-COVERED ARTICLE

(75) Inventors: Tianmin Zheng, Ann Arbor; David Charles Knisely, Commerce Township, both of MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/152,119

(22) Filed: Sep. 14, 1998

(51) Int. Cl.$^7$ ................................................. B29C 45/14
(52) U.S. Cl. ........................ 264/513; 264/516; 264/267; 264/275; 264/294; 425/127; 425/129.1; 425/577
(58) Field of Search .................................. 264/511, 513, 264/544, 554, 163, 154, 266, 516, 267, 572, 275, 255, 294, 328.7; 425/127, 129.1, 577

(56) References Cited

U.S. PATENT DOCUMENTS

| | | |
|---|---|---|
| 3,668,034 | 6/1972 | Nicholas et al. . |
| 4,686,076 * | 8/1987 | Dromigny et al. .................. 264/268 |
| 5,217,563 * | 6/1993 | Niebling et al. ..................... 156/382 |
| 5,401,457 * | 3/1995 | Valyi .................................... 264/511 |
| 5,599,608 | 2/1997 | Yamamoto et al. . |
| 5,624,630 * | 4/1997 | Breezer et al. ...................... 264/553 |
| 5,707,581 * | 1/1998 | Yamazaki ............................. 264/511 |
| 5,776,411 * | 7/1999 | Miyazawa et al. .................. 264/511 |
| 5,843,555 * | 12/1998 | Atake et al. ............................ 428/98 |
| 5,925,302 * | 7/1999 | Oono et al. .......................... 264/267 |
| 5,945,059 * | 8/1999 | Atake .................................. 264/510 |
| 6,001,292 * | 12/1999 | Atake .................................. 264/135 |

FOREIGN PATENT DOCUMENTS

| | | | |
|---|---|---|---|
| 19843912 A1 | * | 3/2000 | (DE) . |
| 2-283414 | * | 11/1990 | (JP) . |

* cited by examiner

*Primary Examiner*—Jan H. Silbaugh
*Assistant Examiner*—Edmund H. Lee
(74) *Attorney, Agent, or Firm*—MacMillan, Sobanski & Todd, LLC

(57) ABSTRACT

A method of manufacturing a film-covered article by the following steps. A thermoplastic film is heated to become pliable. The film has a decorative surface and a backing surface. The heated film is positioned between an open mold. The open mold has a first mold surface, a sealing surface and a sealing member. The sealing surface contacts the sealing member and forms a chamber between the mold and the film. A fluid pressure is applied between the mold and the film to cause the film to conform to the first mold surface. A molten resin is injected adjacent to the film-backing surface to form the film-covered article. The invention may be practiced by either applying a positive pressure to push the film to conform to the first mold surface or a negative pressure to drawing the film against a vacuum between the film and the first mold surface.

2 Claims, 6 Drawing Sheets

METHOD FOR MANUFACTURING A FILM-COVERED ARTICLE

BACKGROUND OF THE INVENTION

1. Field of the Invention

The present invention is directed to a method of manufacturing a film-covered article. More specifically, the invention is directed to manufacturing an injection-molded article having a thermoformed decorative film covering in a single molding tool.

2. Description of the Related Arts

It is known to manufacture molded articles by a method called in-mold lamination. The method is described in U.S. Pat. No. 3,668,034 ('034). The '034 patent teaches placing a decorative laminate within a mold and then injection molding a polymeric material behind the laminate. The resin inlet is juxtaposed the laminate backing. The polymeric material heats, softens and finally fuses to the backing on the laminate.

This reference does not disclose forming the film, but illustrated are two relatively simple two-dimensional films. These films are easily positioned within a tool and molded into an article. Larger articles with three-dimensional surfaces are much more difficult to properly align within a tool. They must be precisely trimmed to the desired dimension. Because these articles are three-dimensional, it is difficult to precisely trim the article after it is molded. The films are easily trimmed while they are flat, but it is desirable to leave the films untrimmed to have excess material for the molding operation. The excess material is useful to retain the film during the thermoforming operation to enable the film to stretch over the mandrel. Films are normally trimmed after they have been formed.

U.S. Pat. No. 5,599,608, teaches a method of thermoforming a film on a mandrel and then trimming the film after it is removed from the mandrel. After the film is molded, it is trimmed. Removing the film from the forming mandrel eliminates the hard-point tooling references for the precise trimming location of the film. Because the film is flexible and formed in a three-dimensional shape, locating these areas precisely is difficult and time consuming.

These thermoforming references all relate to a two-step process whereby the film is first formed and trimmed into the rough shape of the final film-covered article and then transferred into an injection-molding machine. These methods suffer from a difficulty of thermoforming and trimming the film into precisely the desired shape needed for the finished article. The films are generally made from thermoplastic material such as ABS, thermoplastic olefin, and polycarbonate. The film is heated to pliability and then formed. After the film is formed it is cooled. This cooling causes the film to shrink. Unfortunately, this shrinkage is not uniform along the film. Because the film has been shaped into a three-dimensional surface by stretching, some areas are thicker than other areas. These thicker areas shrink more than the thinner areas. The result of the shrinkage is that the cooled part is shaped differently than the thermoforming tool and the injection-molding tool. It presently requires a great deal of effort to match the shape of the cooled thermoformed film to the injection mold surface.

Among the problems associated with matching the thermoformed film and the injection mold tool are differences between the film shape and the tool surface are wrinkles and plastic leakage between the tool surface and the decorative film surface. It is desirable to combine the thermoforming and injection molding operation to provide a low-cost and reliably in-mold lamination process. It is also desirable to utilize the injection mold surfaces to shape the film and to retain the film on the mold surface during injection molding to eliminate alignment difficulties.

These and other objects, features, and advantages of the present invention will become more readily apparent when viewed in connection with the accompanying drawings wherein like reference numbers correspond to like components.

SUMMARY OF THE INVENTION

The present invention is directed to a method of manufacturing a film-covered article by the following steps. A thermoplastic film is heated to become pliable. The film has a decorative surface and a backing surface. The heated film is positioned between an open mold. The open mold has a first mold surface, a sealing surface and a sealing member. The sealing surface contacts the sealing member and forms a chamber between the mold and the film. A fluid pressure is applied between the mold and the film to cause the film to conform to the first mold surface. A molten resin is injected adjacent to the film-backing surface to form the film-covered article. The invention may be practiced by either applying a positive pressure to push the film to conform to the first mold surface or a negative pressure to draw the film against a vacuum between the film and the first mold surface.

It is most preferred to utilize a stationary cavity and a moveable core for the mold part where the cavity has a cavity surface that acts as the first mold surface. Sliding sealing members adjacent to the movable core function to create a sealed cavity between the core surface and the film. A gas such as air or nitrogen is injected into the cavity through the core surface to force the film against the cavity surface.

After the film is forced against the cavity surface, a molten resin is injected adjacent to the backing surface. The resin fuses to the backing surface to form the rigid substrate underlying the film and forming the article body.

In one embodiment of the invention, the film is pierced by an injector nozzle so that molten plastic is injected through the film. In another embodiment, edge gating or core gating allows the substrate to be injection molded without puncturing the film.

The present invention greatly simplifies the process of making film-covered articles because it combines the thermoforming and injection molding operations into one apparatus. The film is thermoformed in the mold surface and remains on this surface during the injection molding operation, thus eliminating any transfer operation. This has the dual benefit of significantly reducing the process cost and improving the final part quality because the film is shaped directly on the cavity surface. The molten plastic resin is injected against the film-backing surface before the film is allowed to cool and shrink.

The final covered article is retained on the mold core, enabling existing unloading equipment to be utilized to remove the article from the mold.

These and other desired objects of the present invention will become more apparent in the course of the following detailed description and appended claims. The invention may best be understood with reference to the accompanying drawings wherein illustrative embodiments are shown.

DETAILED DESCRIPTION OF THE PREFERRED EMBODIMENTS

Figure 1:
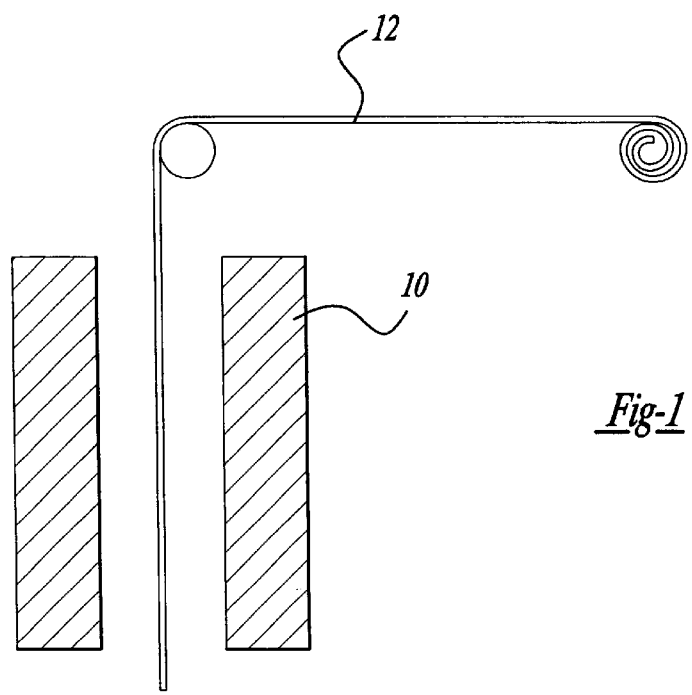
FIG. 1 is a side view of a film heater.

The present invention will be described through a series of drawings, which illustrate the thermoforming and injection molding operation claimed. The invention will also be described as a method of manufacturing an automotive bumper fascia, however other components may also be manufactured using the same or similar process, technique and equipment, and are included within the invention described herein.

Figure 2:
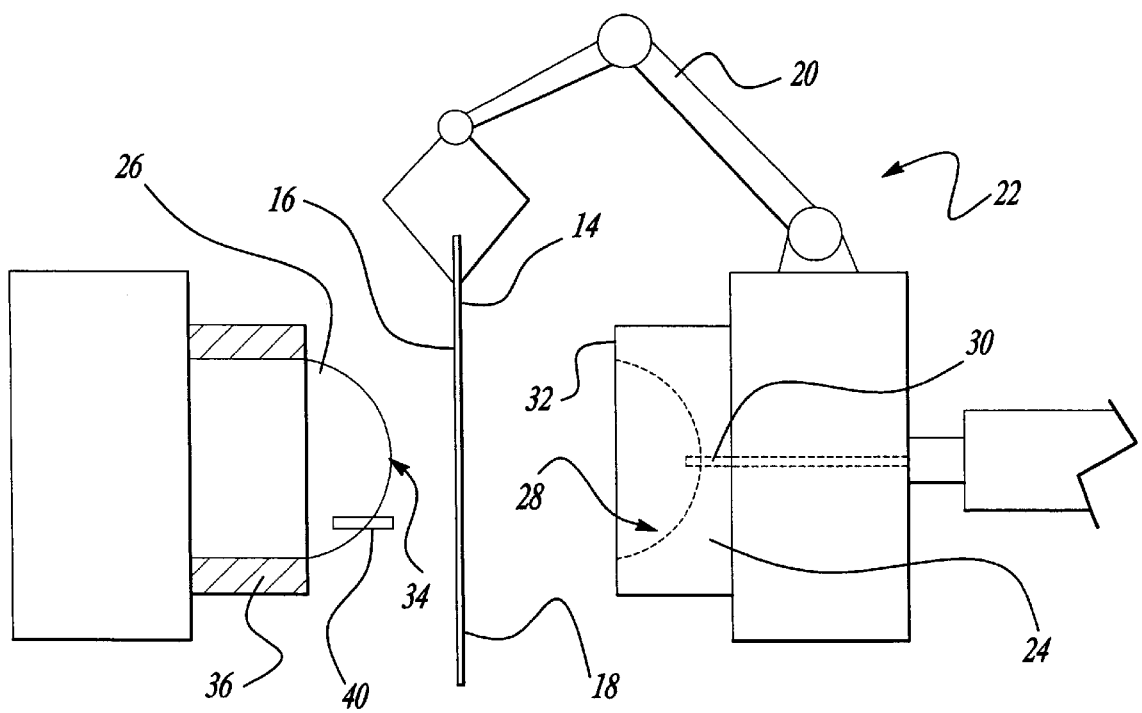
FIG. 2 is a plan view of a thermoforming and injection molding apparatus in an open position.

The following items are a word list of the items described in the drawings and are reproduced to aid in understanding the invention;

10 film heater
12 film
14 decorative surface
16 backing surface
18 section of film
20 robot arm
22 thermoforming and injection mold
24 cavity
26 core
28 cavity surface
30 resin inlet
32 sealing surface
34 core surface
36 sealing member
37 sealing surface
38 chamber
40 gas pin
42 article defining cavity
44 film aperture
45 substrate
46 film-covered panel
48 vacuum apertures
50 edge gates Illustrated in FIG. 1 is a side view of a film heater 10. The heater comprises two resistive heating elements designed to heat both surfaces of film 12. The film 12 is made from thermoplastic and has a decorative surface 14 of paint or other material and a backing surface 16 made of thermoplastic. The backing surface is designed to fuse to the molten plastic injected adjacent to the backing surface 16 as will be described in more detail below. The film 12 is generally produced into a roll or coil and is uncoiled and dispensed into the heater 10. After the film 12 has been heated to become pliable, a section of film 18 is cut from the film 12 and retained in a robotically controlled arm 20. The arm 20 secures the top edge of the section 18 as shown in FIG. 2.

The film section 18 is positioned within a thermoforming and injection mold 22. The mold 22 includes a stationary cavity 24 and a movable core 26. The mold 22 is of the type generally used for injection molding but having the adaptations described herein.

The cavity 24 includes a cavity surface 28 that imparts a shape to the film section 18 and the film-covered article. Located on the cavity surface 28, is a resin inlet 30. The resin inlet 30 is designed to pierce or rupture the film section 18 after thermoforming. The resin inlet 30 receives the molten plastic resin. The cavity 24 includes a sealing surface 32 around the perimeter of the cavity surface 28.

The core 26 includes a core surface 34 that imparts a shape to the article substrate. The core 26 is mounted onto an injection molding press that moves the core in the direction of the arrows. Positioned around the perimeter of the core surface 34 is a movable sealing member 36. The sealing member 36 extends and retracts. The sealing member 36 includes sealing surfaces 37 that seals the space between the core 26 and the sealing member 36. The sealing member 36 is retracted as shown in FIG. 2 when the mold is in the open position.

Figure 3:
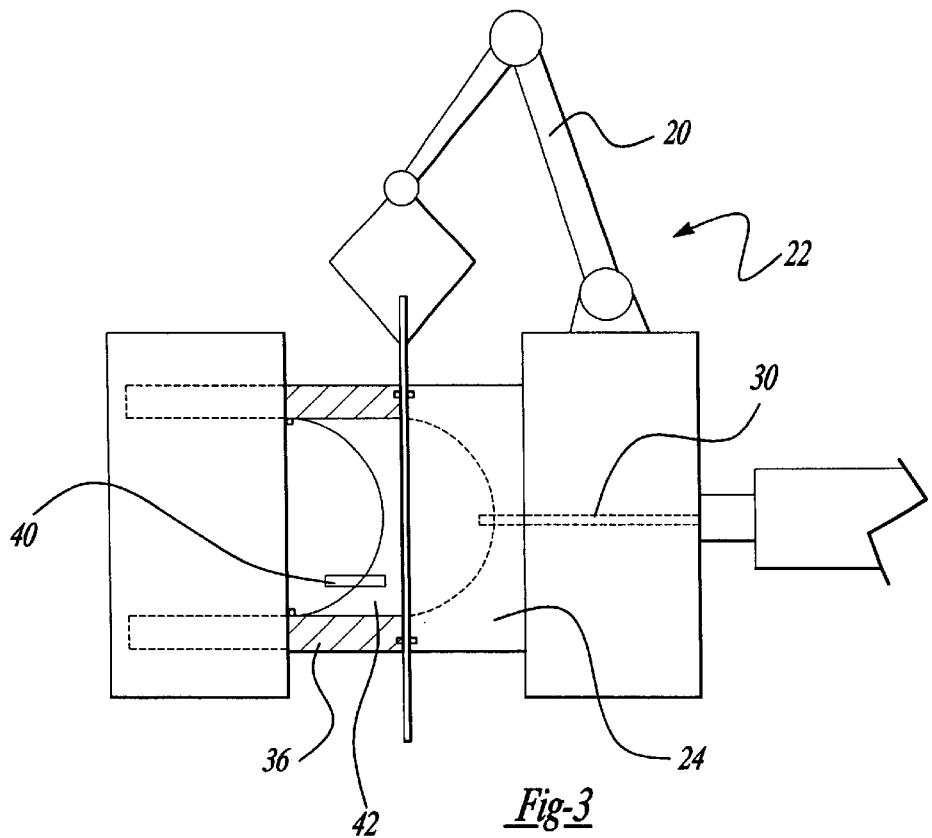
FIG. 3 is the apparatus of FIG. 2 in a sealed position.

The sealing member 36 is moved to the extended position when the mold 22 is moved to the sealed position as shown in FIG. 3. The sealing member 36 pushes firmly against the sealing surface 32 with the film section 18 therebetween. The film section 18 forms a seal between the sealing member 36 and the sealing surface 32. The core 26 is moved closer but does not contact the backing surface 16. The film section 18, sealing member 36 and core surface 34 form a chamber 38. After the sealing member 36 contacts the sealing surface 32, a gas pin 40 on the core 26 is opened. The gas pin 40 introduces a pressurized gas into the chamber 38. The gas is generally inert such as nitrogen or air and can be heated for better forming efficiency. The gas pressure is dependent on the material properties of the film section 18. Generally, thicker films or articles having deeper draws will require higher gas pressures. Gas pressures will generally range between 200 and 2000 psi.

Figure 4:
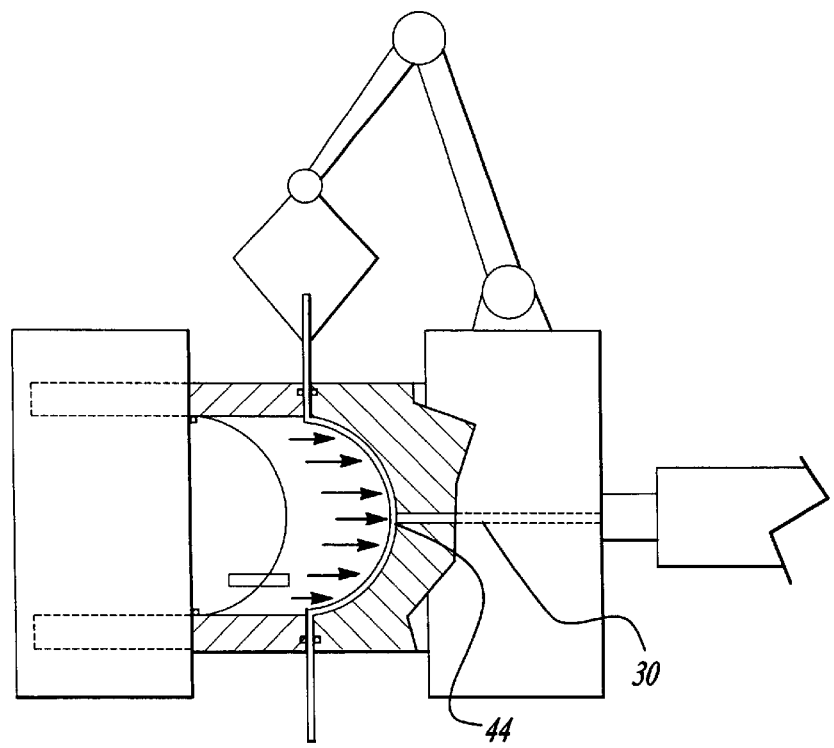
FIG. 4 is the apparatus of FIG. 2 thermoforming the film.
Figure 5:
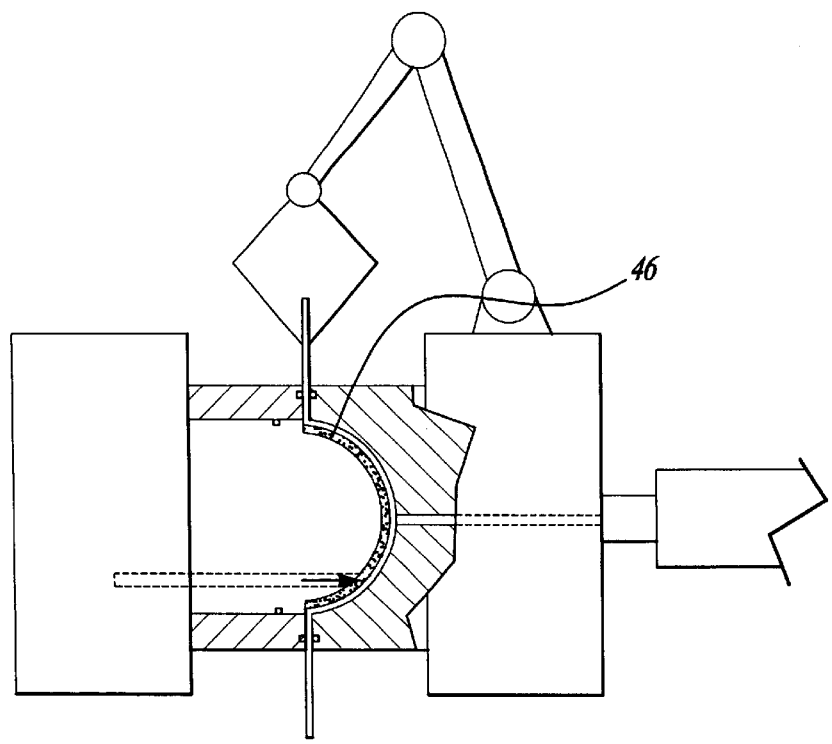
FIG. 5 is the apparatus of FIG. 2 injection molding the substrate.

The pressurized gas pushes the pliable film section 18 against the cavity 24. The film section closely conforms to the contours of the cavity surface 28 as shown in FIG. 4. The core 26 is moved into the cavity 24 without contacting the backing surface 16. The cavity surface 28 is positioned a distance away from the backing surface to create an article defining cavity 42 as shown in FIG. 5. The spacing distance becomes the thickness of the molded substrate.

Figure 6:
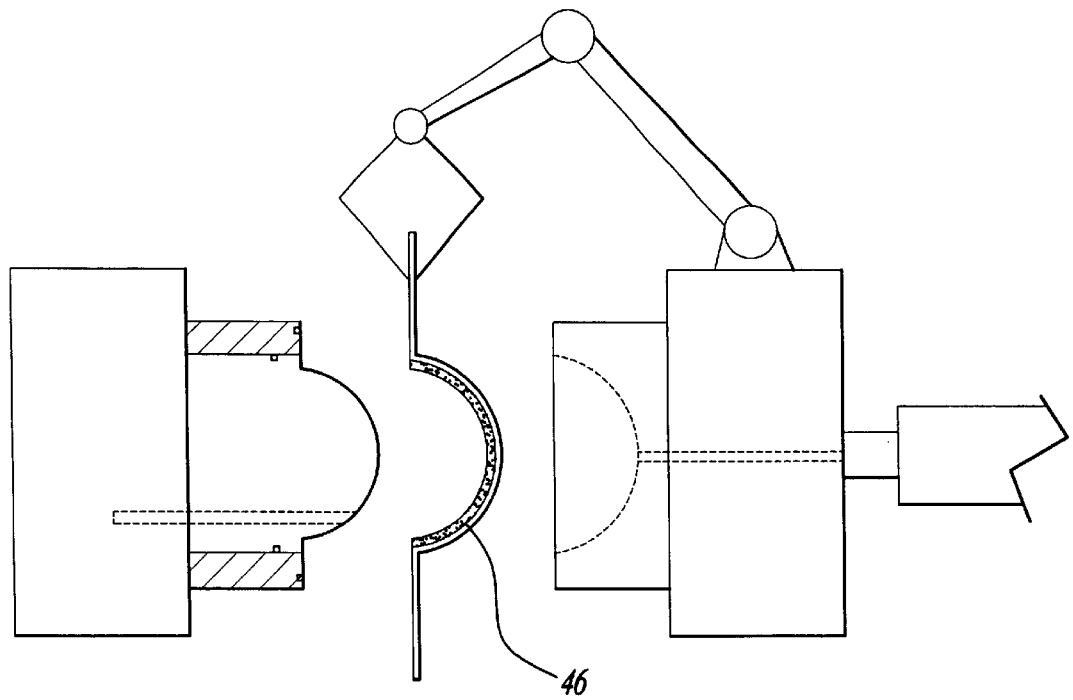
FIG. 6 is the apparatus of FIG. 2 in the open position removing the film-covered article.
Figure 7:
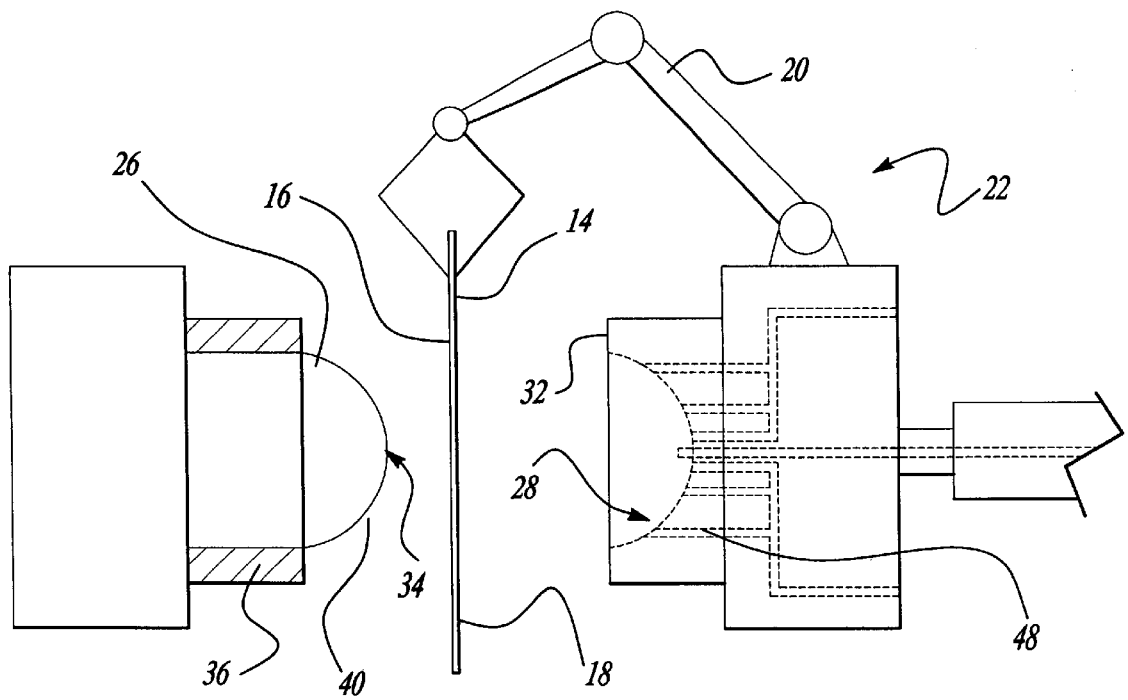
FIGS. 7–10 illustrate an alternative embodiment of the invention.

The resin inlet 30 creates an aperture 44 in the film section 18. The aperture 44 may be formed by cutting or tearing the film section 18 on a knife edge placed on the resin inlet 30, or the resin inlet 30 may be pushed through the film section 18. After the core 26 is fully extended and the aperture 44 is created in the film section 18, the resin inlet 30 injects a molten resin into the cavity 42 and the gas pressure is vented by a pressure relief mechanism. The molten resin fills the cavity 42 and adheres to the still hot backing surface 18. The plastic is allowed to cool and solidify and form the substrate 45 of the covered-panel 46 as shown in FIG. 6. The arm 20 removes the finished panel 46 from the mold 22.

Figure 8:
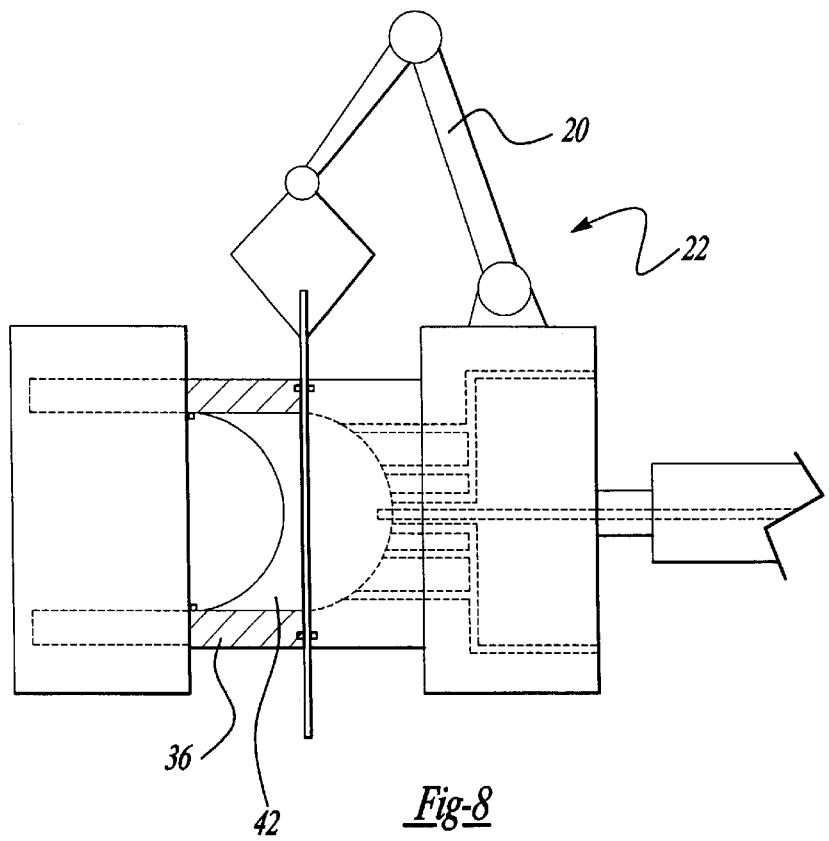
Figure 9:
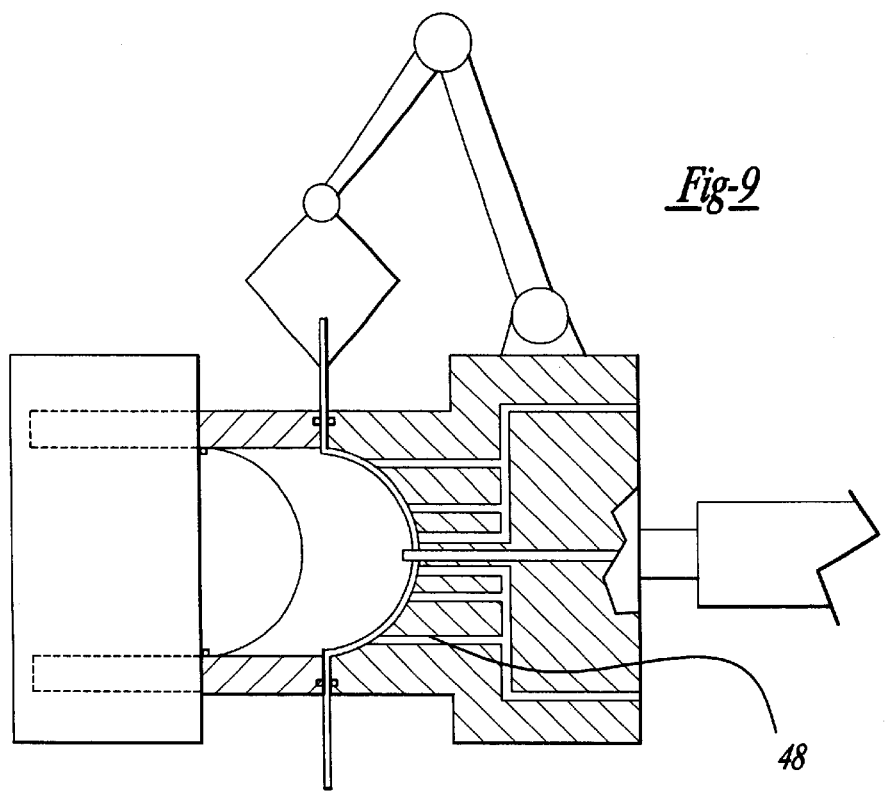
Figure 10:
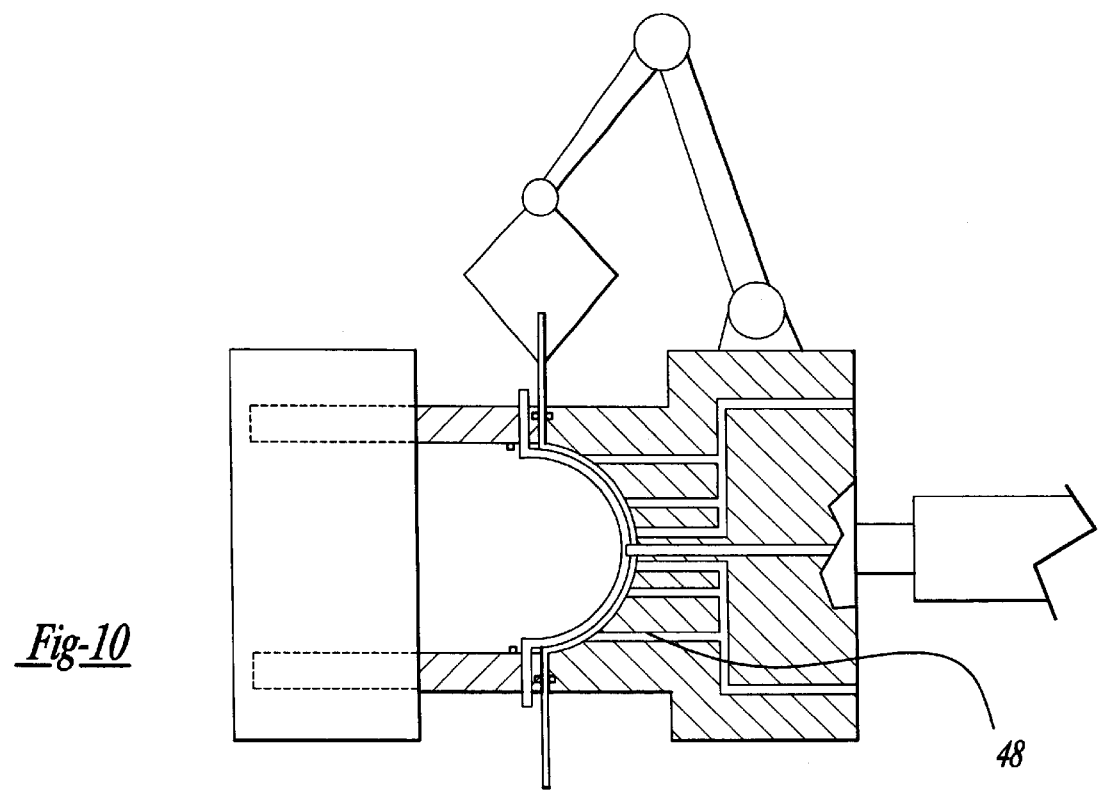

In an alternative embodiment of the invention, the positive gas pressure applied through the gas pin is replaced by a series of vacuum apertures as illustrated in FIGS. 7–10. The cavity surface 28 includes a plurality of small vacuum apertures 48. The size of the apertures is selected so as not to mar the decorative surface 14 during injection molding. The film section 18 is placed between the open mold 22. The core 26 is moved to the sealed position as shown in FIG. 8.

A vacuum is applied to the vacuum aperture 48 to draw the film section 18 against the cavity surface 28. The remainder of the process is the same as described above. The vacuum process of this alternative embodiment is useful when the film section 18 is relatively thin and when relatively low injection molding pressures are used.

Figure 11:
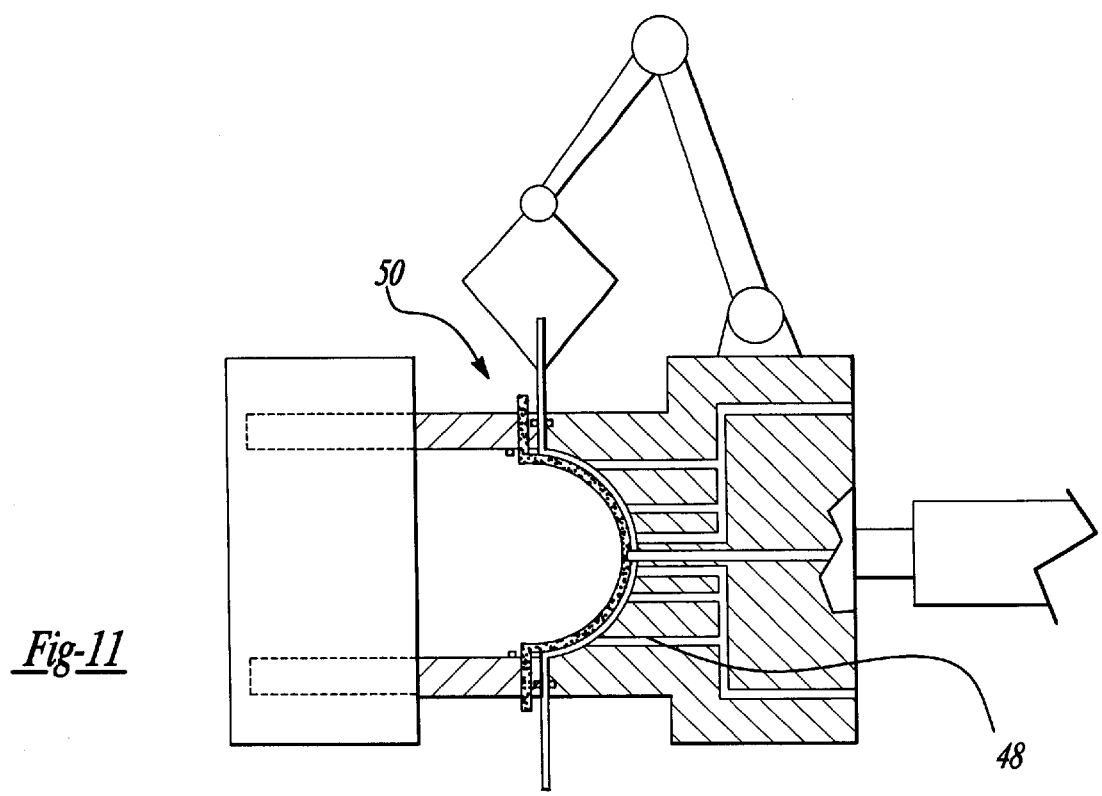
FIG. 11 is yet another alternative embodiment of the invention.

Another alternative embodiment that does not require piercing the film section 18 is illustrated in FIG. 11. In this alternative embodiment, edge gates 50 inject molten resin directly adjacent to the backing surface 16 without passing through the film. It is also possible to gate the molten plastic through the core and directly onto the backing surface.

While the best modes for carrying out the invention have been described in detail, those familiar with the art to which this invention relates will recognize various alternative designs and embodiments for practicing the invention as defined by the following claims.

What is claimed is:

1. A method of manufacturing a film-covered article comprising a resin substrate and a film covering fused to the resin substrate, the method comprising the steps of:

providing a movable mold having a stationary cavity surface and a movable core surface, said cavity surface having a sealing surface and said core surface having a sealing member;

heating a pliable film having a backing surface and a decorative surface in a heater;

moving said mold to an open position;

positioning said heated film between said cavity and core surfaces, said decorative surface juxtaposed said cavity surface;

moving said mold to a sealed position and sealing said film between said sealing surface and sealing member and forming a chamber between said core surface and said film;

opening a gas pin on said core surface and applying a positive gas pressure through said pin to cause said film to conform to said cavity surface;

moving said mold to a molding position wherein said core surface is positioned a distance away from said backing surface to create an article defining cavity, said distance being the thickness of said resin substrate; and injecting a molten resin through a resin inlet into said article-defining cavity adjacent to said backing surface to form said film-covered article.

2. A method of manufacturing a film-covered article comprising a resin substrate and a film covering fused to the resin substrate, the method comprising the steps of:

providing a movable mold having a stationary cavity surface and a movable core surface, said cavity surface having a sealing surface and said core surface having a sealing member;

heating a pliable film having a backing surface and a decorative surface in a heater;

moving said mold to an open position;

positioning said heated film between said cavity and core surfaces, said decorative surface juxtaposed said cavity surface;

moving said mold to a sealed position and sealing said film between said sealing surface and sealing member and forming a chamber between said core surface and said film;

opening a gas pin on said core surface and applying a positive gas pressure through said pin to cause said film to conform to said cavity surface;

forming an opening in said film for passing a molten resin through said film;

moving said mold to a molding position wherein said core surface is positioned a distance away from said backing surface to create an article defining cavity, said distance being the thickness of said resin substrate; and injecting a molten resin through a resin inlet on said cavity surface and through said opening in said film into said article defining cavity adjacent to said backing surface to form said film-covered article.

* * * * *